United States Patent
Wiezbowski

Patent Number: 6,084,224
Date of Patent: Jul. 4, 2000

[54] IN-SITU CLOSED LOOP TEMPERATURE CONTROL FOR INDUCTION TEMPERING

[75] Inventor: Michael F. Wiezbowski, Livonia, Mich.

[73] Assignee: Chrysler Corporation, Auburn Hills, Mich.

[21] Appl. No.: 09/139,504

[22] Filed: Aug. 25, 1998

Related U.S. Application Data

[63] Continuation-in-part of application No. 08/810,395, Mar. 3, 1997.

[51] Int. Cl.[7] .................................................. H05B 6/08
[52] U.S. Cl. ............................................. 219/667; 219/632
[58] Field of Search ........................... 219/667, 632, 219/673, 652, 605; 266/90, 129; 148/509, 511, 566, 567

[56] References Cited

U.S. PATENT DOCUMENTS

| | | | |
|---|---|---|---|
| 2,799,760 | 7/1957 | Fruengel | 219/10.75 |
| 3,153,132 | 10/1964 | Greene | 219/10.75 |
| 3,296,406 | 1/1967 | Stein et al. | 219/10.77 |
| 3,385,579 | 5/1968 | Peck et al. | 263/6 |
| 3,590,201 | 6/1971 | Basinger | 219/8.5 |
| 3,824,366 | 7/1974 | Garnier | 219/10.77 |
| 3,842,234 | 10/1974 | Seyfried | 219/673 |
| 3,846,609 | 11/1974 | Enk | 219/652 |
| 4,307,276 | 12/1981 | Kurata et al. | 219/10.41 |
| 4,327,265 | 4/1982 | Edinger et al. | 219/605 |
| 4,532,396 | 7/1985 | Burack et al. | 219/632 |
| 4,785,147 | 11/1988 | Mucha et al. | 219/10.59 |
| 4,845,332 | 7/1989 | Jancosek et al. | 219/10.77 |
| 5,250,776 | 10/1993 | Pfaffmann | 148/509 |
| 5,349,167 | 9/1994 | Simcock | 219/662 |
| 5,391,862 | 2/1995 | Amateau et al. | 219/667 |
| 5,414,247 | 5/1995 | Geithman et al. | 219/667 |
| 5,518,560 | 5/1996 | Li | 156/64 |
| 5,630,957 | 5/1997 | Adkins et al. | 219/665 |
| 5,885,522 | 3/1999 | Giannini et al. | 266/90 |

*Primary Examiner*—Philip H. Leung
*Assistant Examiner*—Quang Van
*Attorney, Agent, or Firm*—James R. Yee

[57] ABSTRACT

A method and apparatus for in-situ induction tempering is provided in which an induction coil is used to temper a part in-situ at the location. The use of an induction coil in-situ at the heat treating location eliminates the need (and time and expense) of a multi-step process wherein in part to be tempered would otherwise have to be moved from the quenching location to the tempering location, such as at a tempering furnace. It also eliminates the need for the tempering furnace, which is a great space savings. In one form of the invention, the power supplied to the induction coil is controlled by a closed-loop temperature controller that is controlled by the temperature in the vicinity of the tempered part, as opposed to simply be controlling on time at temperature.

10 Claims, 3 Drawing Sheets

IN-SITU CLOSED LOOP TEMPERATURE CONTROL FOR INDUCTION TEMPERING

CROSS REFERENCE TO RELATED APPLICATION

This application is a continuation-in-part of application Ser. No. 08/810,395, filed on Mar. 3, 1997, entitled "Closed Loop Temperature Control For Induction Tempering," assigned to common assignee Chrysler Corporation.

BACKGROUND OF THE INVENTION

1. Field of the Invention

The present invention relates generally to methods of heat treating such as induction tempering and particularly to a method of induction tempering that performs the tempering at the same location as hardening in the heat treating process, termed "in-situ" tempering.

2. Discussion

Brazing is a well-known method of joining two metal pieces by fusing a layer of alloy between adjoining surfaces. It also is known to heat the brazing alloy layer in the region of the joint by use of an induction coil encircling the joined members in the plane of the brazing alloy layer (flux) for its fusion. The energy supplied to the induction coil typically is controlled by either visual operation of the heating effect on the brazing ring or by time, that is, the coil is simply powered for a predetermined time, with hopefully the desired result achieved.

This approach leads to problems, particularly when brazing is done of thin-walled members such as condenser tubes of the type used in automotive applications. Such tubes typically are brazed to the condenser via sockets and are constructed of materials with complex chemistry such as aluminum. In such cases, brazing typically is performed with an aluminum alloy. This combination of a thin-walled tube and the complex chemistry of aluminum makes for a difficult mix. For example, it is extremely difficult to control the temperature of aluminum and it is easy to melt through a thin-walled tube during the brazing process. Under heating causes inadequate penetration of the brazing ring into the brazed joint. Such heating variations are exacerbated by variations in the tubing wall dimension, variations in the amount of flux applied, variations in the air gap between the tube and the socket, and variations in the tube's position relative to the induction coil. High scrap rates have resulted from the problems inherent in such brazing processes.

For example, aluminum condensers have been induction brazed by Chrysler Corporation in a manufacturing process typically consisting of brazing ½ inch or ⅝ inch header tubes to a condenser socket. The tubes are manually assembled with a braze ring of an aluminum alloy prior to presentation at the induction machine. Up to 40% of the product typically either requires rework or is scrapped due to heating variations of the brazed joint.

Thus it would be desirable to provide a method and apparatus of induction brazing wherein the energy supplied to the braze alloy could be controlled in a manner to minimize defective brazed joints.

It would further be desirable to provide a method and apparatus for induction brazing wherein the power supplied to the induction coil could be controlled by a signal that is indicative of the state of the brazed joints.

Accordingly, the invention disclosed in the parent application provides a method and apparatus for induction brazing in which the power supplied to the induction coil is controlled by a closed-loop temperature controller that is controlled by the temperature in the vicinity of the brazed joint. The use of a closed-loop temperature controller allows for a uniform heat input to the brazed joint, eliminating production scrap or rework. By using the method and apparatus of the present invention Chrysler has increased its throughput from 60% to 90%. In the present invention an optical pyrometer senses the emitted radiation from the brazed joint. A controller conditions the input and provides a signal to the power supply for output power control. The controller is programmed to control around a specific set point which corresponds to the desired brazing temperature of the base alloy. With closed loop control the brazing process is rendered insensitive to process variation. Additionally, flux drying ovens no longer are required in the brazing process.

The method and apparatus of the invention disclosed in the parent application comprises brazing a first member to a second member via an inductive coil placed around a brazing ring of alloy at the brazed joint connection of the two members. Temperature at the brazed joint is sensed via an optical pyrometer and the power to the induction coil is controlled via a closed loop controller to bring the temperature to a specific set point corresponding to the desired brazing temperature of the alloy.

It is further a common practice to increase the strength of carbon steel by heat treatment of the steel. The invention disclosed in this Continuation-in-Part application relates more specifically to this practice, and uses technology related to the method and apparatus disclosed in the parent application. One method of heat treating carbon steel changes the steel's microstructure to produce martensite, which is an extremely hard and brittle phase of the steel that forms when the steel's temperature is raised above a certain critical temperature, for example, 1550° F. for 1050 steel, and then rapidly cooled to room temperature. The resulting martensitic steel is strong but relatively brittle due to internal residual stresses resulting from the uneven, rapid cooling and martensite expansion. Tempering of the steel is an additional known step in the hardening process that is done following the formation of the martensite and that relieves the residual stresses and results in a tougher, slightly weaker microstructure called tempered martensite.

Tempering typically is done at lower temperatures than the initial heating (300° F.–700° F.) for periods of up to one hour. Tempering typically is accomplished through the use of a large furnace, which provides a uniform distribution of heat throughout the tempered components. The large furnace that typically is used requires a large amount of space. Furnace tempering further involves a multistep procedure wherein the parts are first heat treated to form martensite in one location, removed from that location, moving to the tempering furnace, and then tempered. This multistep process obviously involves extensive manpower and equipment resources.

Known induction tempering techniques also control the tempering only by controlling the time the part is tempered, often resulting in overtempering and subsequent weakening of the part.

Accordingly, it is a principal objective of the present invention to provide a method and apparatus for tempering in which the tempering is performed at the same location that the initial heat treating occurs, through use of an induction coil, termed "in-situ" tempering. An induction coil and apparatus similar to that used ill the brazing operation disclosed in the parent application is used to perform the in-situ tempering of the present invention.

It is another object of the present invention to provide a method and apparatus for in-situ tempering that uses closed loop temperature control to prevent overtempering and that allows uniform tempering to be obtained throughout the case depth of a part and not limited to simply a "surface temper" which is typically found in industry.

DETAILED DESCRIPTION OF THE INVENTION

Figure 1:
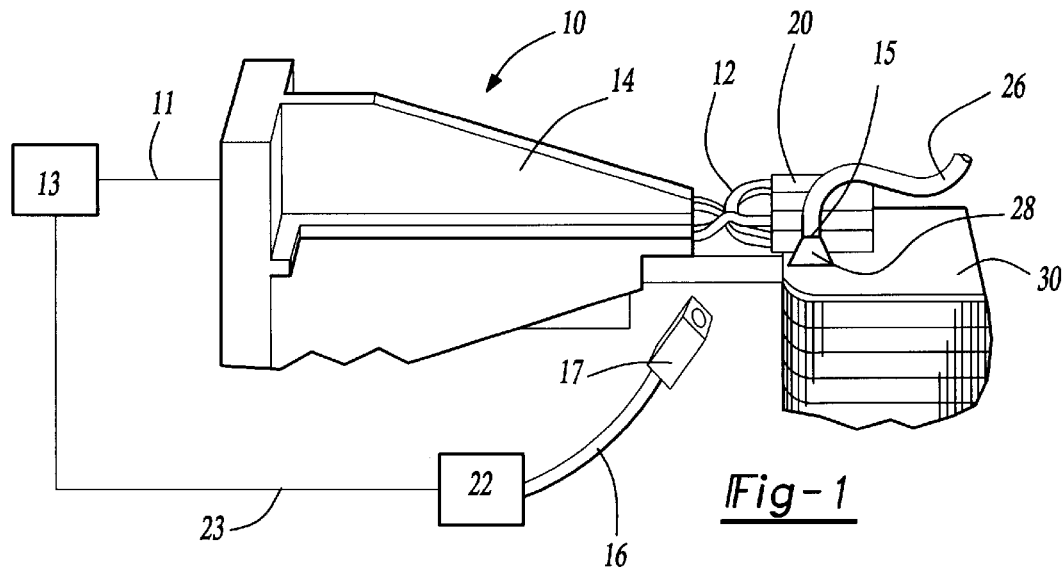
FIG. 1 is a perspective, partially cut-away, partially schematic, view of the apparatus used in conjunction with the method of the present invention.
Figure 2:
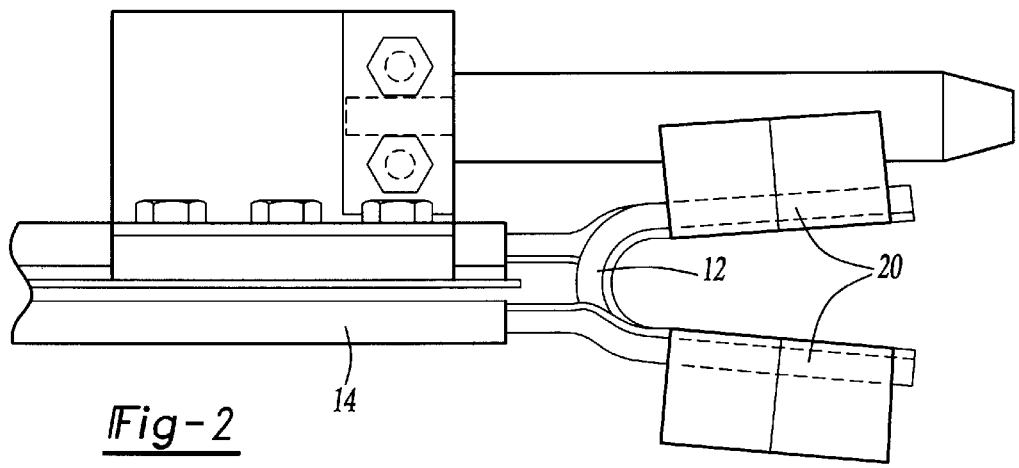
FIG. 2 is a top perspective view of a typical induction coil used with the method of the present invention.
Figure 3:
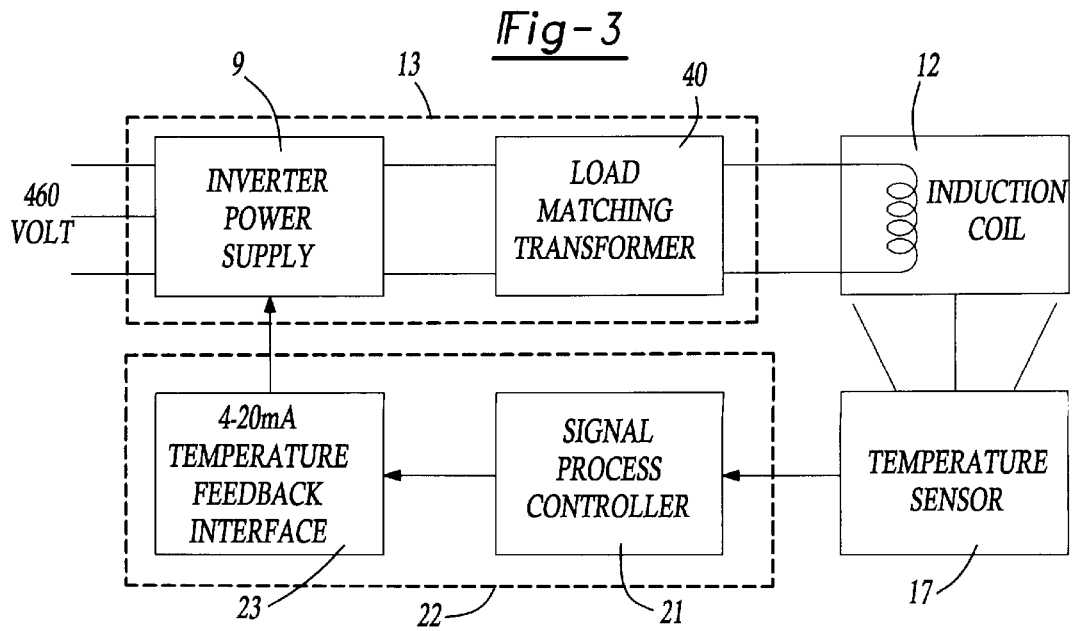
FIG. 3 is a simplified schematic illustration of the electrical circuit of the apparatus used in conjunction with the method of the present invention.

FIG. 1, FIG. 2, and FIG. 3 show the apparatus of the present invention. Induction brazing apparatus 10 comprises induction coil 12, preferably a 10 kHz induction coil of the type that is known in the art and which preferably comprises C-geometry field intensifier 20 of the type that is known in the art. Coil 12 is electrically connected to power supply 13 via connector means 11 passing through arm 14. Any type of appropriate electrical connection may be used for the electrical connections. Power supply 13 preferably comprises inverter power supply 9 which supplied with 460 volt power and also preferably comprises load matching transformer 40. Temperature sensor 17, which preferably is a dual frequency dual color optical pyrometer of the type that is known in the art, for elimination of emissivity adjustments, senses peak surface temperature in the vicinity of the brazed joint 15, which connects tube 26 to socket 28 of condenser 30. Sensor 17 provides sensed temperature via any appropriate means, such as fiber optical infra-red pickup 16, to controller means 22. Controller means 22 is preferably a closed loop controller and more preferably comprises a signal process controller 21 and a 4–20 milliamp feedback interface 23. It may comprise any appropriate type of closed loop temperature control system, however. Means 22 is connected by connecting means 23 to power supply 13 and controls the power supply, means 23 again which may comprise any appropriate type of electrical connection.

In operation, coil 26 is brought into the vicinity of socket 28. A ring of brazing alloy (flux) such as an aluminum alloy is provided at the brazed joint 15. Induction coil 12 is maneuvered into place over the brazed joint via arm 14 and appropriate machinery that is known in the art, the joint connecting adjoining tube 26 and socket 28 of condenser 30. Such tubes typically are aluminum and are thin-walled tubes of ½" to ⅝" in diameter. Power supply 12 is energized, powering the induction coil. The surface temperature in the vicinity of the brazed joint is sensed by sensor 17 and a signal sent to signal process controller means 22. Once peak surface temperature has reached the desired surface temperature within a certain window, 1075° F.±25° F. in the case of aluminum alloy, that being the desired brazing temperature, the controller causes the power supply to shut off.

Figure 4:
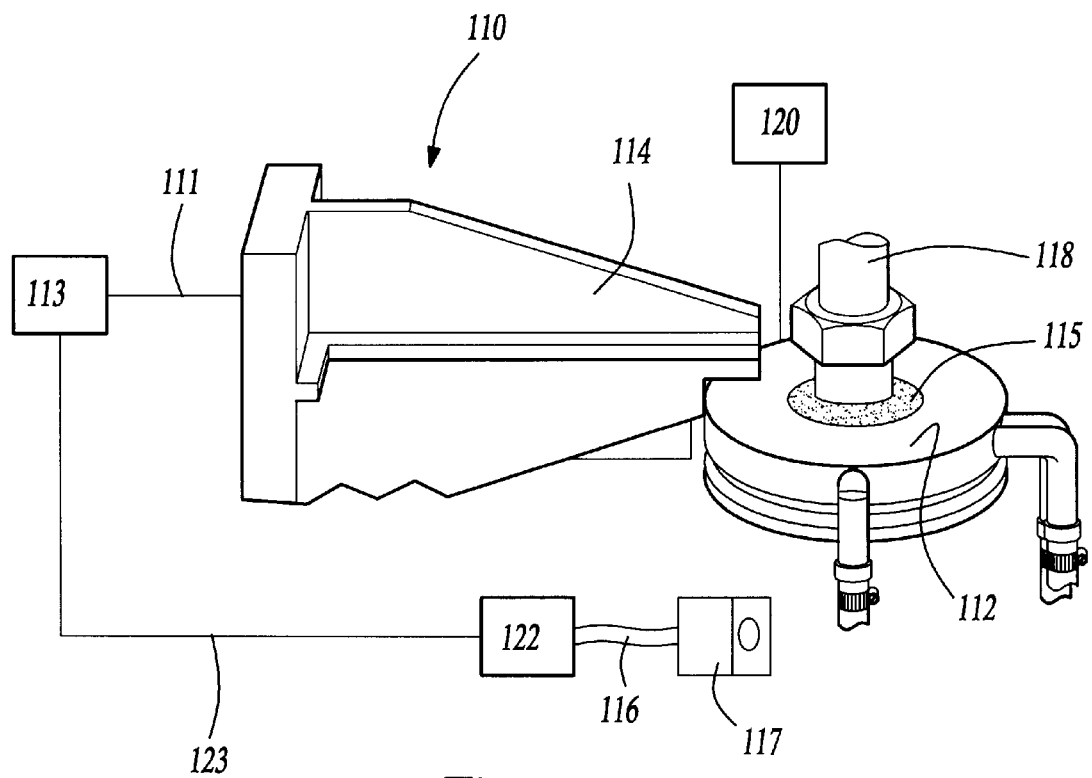
FIG. 4 is a perspective, partially cut-away, partially schematic view of the apparatus used in conjunction with another embodiment of the method of the present invention.
Figure 5:
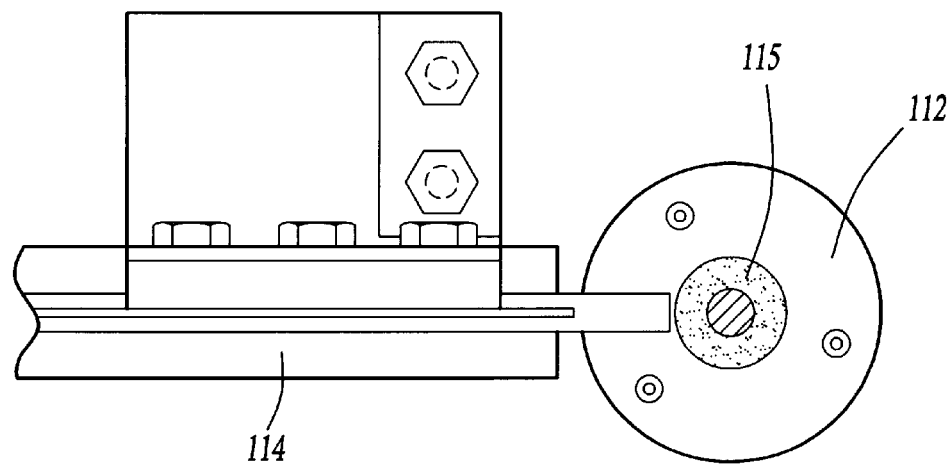
FIG. 5 is a top perspective view of an induction coil used with another embodiment of the method of the present invention.
Figure 6:
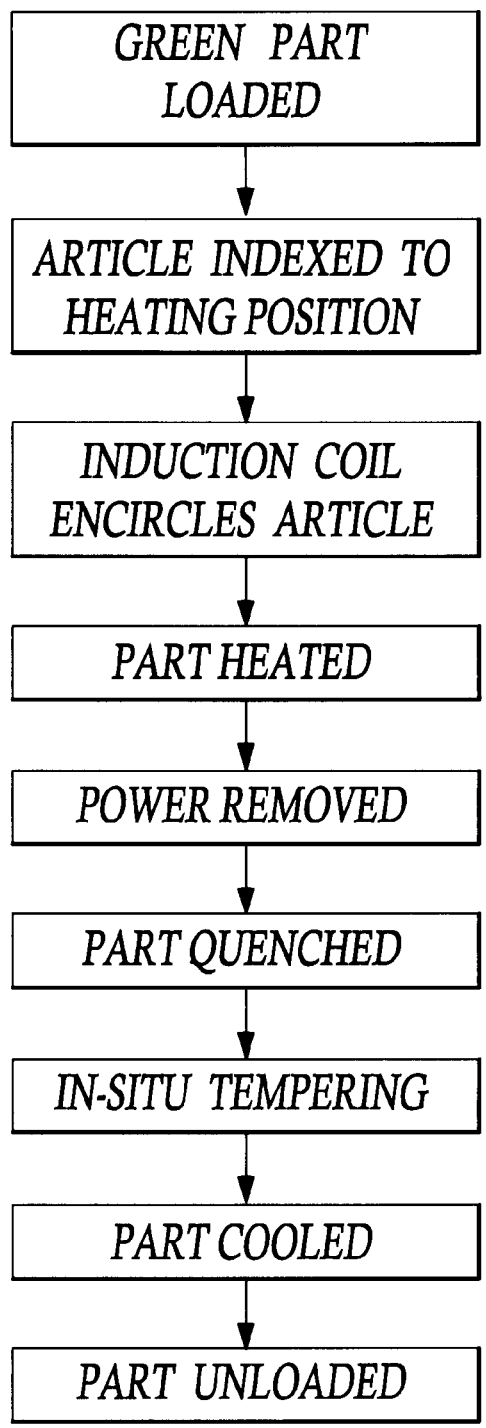
FIG. 6 is a flow chart showing the method of the present invention.

Turning to FIGS. 4, 5 and 6, a further embodiment of the present invention, and, specifically, the in-situ tempering disclosed in the continuation-in-part application, takes the process one step further. It makes use of an induction apparatus that is similar to the first embodiment disclosed herein to perform in-situ heat treatment of an article.

In accordance with this method, as shown in FIG. 6, the following steps are performed to conduct "in-situ" tempering:

1) An untempered or "green" part is loaded in a heat treatment apparatus (110);

2) the part is indexed to a heating position, where an induction coil then encircles the area of the part to be heat treated and is supplied power from a 10 kHz to 50 kHz power supply (120) (see FIGS. 4 and FIG. 5);

3) the part is rotated and heated in the heating position by the induction coil for a predetermined time to raise the surface temperature to a predetermined temperature, for example, 1650° F. (130);

4) the power to the induction coil is turned off (140); and 5) the part is immediately quenched with a water/polymer mix to bring it to near ambient temperature (150).

This completes the hardening portion of the cycle. The part is still in the heating position. The temper cycle now begins, and the following steps take place.

6) the quench material is removed (160);

7) the power supply to the induction coil is activated a second time (170) at a lower output density, to impart sufficient heat into the part such that the desired case depth is tempered, for example, from 0.030 to 0.150 inches of case depth. A fiber optic sensor controls surface temperature to prevent overheating the part (which would result in an overtempered part), preferably using closed loop temperature control as described above. For example, the controller can be set to monitor and maintain surface temperature at approximately 450 degrees F. This temperature is not exceeded, to avoid an over temper condition. This controller operation allows the part to achieve tempering hardware profiles throughout the entire case depth merely identical to that of a furnace, in a period of time of 15–20 seconds. Microstructure of fully tempered martensite is significantly more tough and more durable under bending loads.

8) After tempering the part may be cooled a second time for operator handling (130).

9) The part is then indexed to the load/unload position and removed from the machine (150).

FIGS. 4 and 5 show the apparatus of this embodiment of the present invention.

Induction brazing apparatus 110 comprises induction coil 112 shaped to fit around the part to be tempered, such as a small ring gear, and which is preferably a 10 kHz–50 kHz induction coil of the type that is known in the art and which preferably comprises C-geometry field intensifier 120 of the type that is known in the art. Coil 112 is electrically connected to power supply 113 via connector means 111 passing through arm 114. Any type of appropriate electrical connection may be used for the electrical connections. The electrical circuit supply power is preferably the same as shown in FIG. 3. Temperature sensor 117, which preferably is a dual frequency dual color optical pyrometer of the type that is known in the art, for elimination of emissivity adjustments, senses peak surface temperature in the vicinity of the tempered part 115, which is a ring gear in the figure shown. Sensor 117 provides sensed temperature via any appropriate means, such as fiber optical infra-red pickup 116, to controller means 122. Controller means 122 is preferably a closed loop controller and more preferably comprises a signal process controller 121 and a 4–20 milliamp feedback interface 123. It may comprise any appropriate type of closed loop temperature control system, however. Means 122 is connected by connecting means 123 to power supply 113 and controls the power supply, means 123 again which may comprise any appropriate type of electrical connection.

From the invention as described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A system for induction-tempering an article comprising:
   a power supply;
   an induction coil, said coil operatively connected to said power supply;
   a temperature sensor, said sensor adapted to sense the temperature in the vicinity of said coil;
   said sensor operatively connected to said power supply such that it controls said power supply;
   wherein said temperature sensor controls said power supply such that said induction coil is adapted to first harden with a first power level and then temper said article with a second power level different than the first power level, said temperature sensor controlling said power supply during the tempering of said article such that said induction coil imparts an amount of heat into the article to temper said article to a predetermined case depth.

2. The apparatus of claim 1 wherein said sensor comprises a fiber optic sensor.

3. The apparatus of claim 1 further comprising a closed loop feedback temperature controller operatively connected to control said power supply.

4. A method of induction-tempering an article comprising the steps of:
   providing an article to be tempered;
   providing an induction coil;
   placing said article proximate said coil;
   energizing said coil;
   providing a temperature sensor;
   sensing the temperature adjacent said coil to provide a temperature signal; and
   operatively controlling said induction coil with said signal such that said induction coil is adapted to first harden with a first power level and then temper said article with a second power level different than the first power level, said temperature sensor controlling said power supply during the tempering of said article such that said induction coil imparts an amount of heat into the article to temper said article to a predetermined case depth.

5. The method of claim 4 further comprising the step of providing a closed loop feedback temperature controller for operatively controlling said induction coil.

6. The method of claim 4 wherein said temperature sensor comprises a fiber optic sensor.

7. An apparatus for in-situ tempering of an article comprising:
   an induction coil;
   a power supply;
   a temperature sensor;
   controller means;
   said power supply operatively connected to said induction coil;
   said controller means operatively connected to said power supply;
   wherein said sensor senses the temperature proximate said article and provides said sensed temperature to said controller means;
   said controller means controls said power supply based on said sensed temperature; and
   said controller means controls said power supply such that said induction coil is adapted to first harden with a first power level and then temper said article with a second power level different than the first power level, said controller means controlling said power supply during the tempering of said article such that said induction coil imparts an amount of heat into the article to temper said article to a predetermined case depth.

8. The apparatus of claim 7 wherein said temperature sensor comprises an optical pyrometer.

9. The apparatus of claim 7 wherein said controller means further comprises a closed loop temperature controller.

10. The apparatus of claim 7 wherein said induction coil further comprises a field intensifier.

* * * * *